No. 699,512. Patented May 6, 1902.
B. G. FOSTER.
THILL COUPLING.
(Application filed Sept. 3, 1901.)
(No Model.)
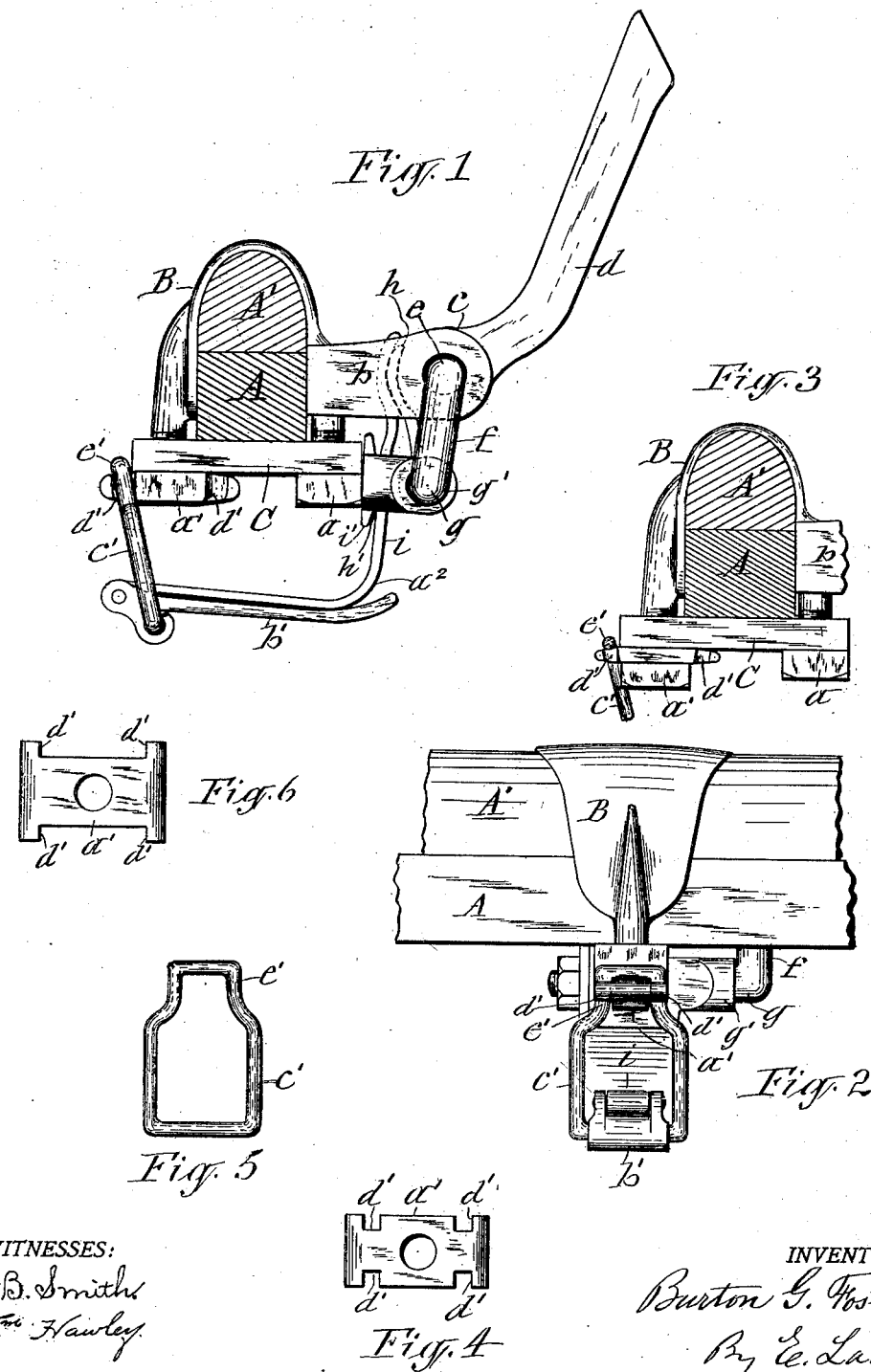
WITNESSES:
H. B. Smith
Wm. Hawley
INVENTOR.
Burton G. Foster
By E. Laass
ATTORNEY.

UNITED STATES PATENT OFFICE.

BURTON G. FOSTER, OF VERONA, NEW YORK.

THILL-COUPLING.

SPECIFICATION forming part of Letters Patent No. 699,512, dated May 6, 1902.

Application filed September 3, 1901. Serial No. 74,060. (No model.)

*To all whom it may concern:*

Be it known that I, BURTON G. FOSTER, a citizen of the United States, and a resident of Verona, in the county of Oneida, in the State of New York, have invented new and useful Improvements in Thill-Couplings, of which the following, taken in connection with the accompanying drawings, is a full, clear, and exact description.

This invention relates to a specific improvement in that class of thill-couplings shown and described in United States Letters Patent No. 645,872, issued March 20, 1900, to William F. Schubert and myself and which comprise a spring-actuated jaw or tongue, which is pressed against the shackle-eye of the thill-iron to prevent rattling between said shackle-eye and coupling pin or bolt. In thill-couplings of this character the spring is usually operated by a lever pivotally connected thereto, and to the lever is connected one end of a bail or link, the opposite end of which latter is made to engage an upwardly-projecting lip or shoulder formed either on the rear end of the clip-bar or rear of the clip-nut to retain the bail in connection with the said bar or nut.

The objects of this invention are, first, to employ the rear clip-nut for locking thereon the aforesaid bail, and thus obviate the necessity of removing the clip-tie from the clip when it is desired to renew the bail-locking device; secondly, to obviate weakening the nut by forming thereon the bail-locking device; thirdly, to maintain the entire depth of the nut across the bail-locking device, and thus obtain maximum strength of said part; fourthly, to obtain greater security against accidental release of the bail from the nut; fifthly, to permit renewal of the bail-locking devices without requiring removal of the nut, and, sixthly, to facilitate and cheapen the manufacture of the nut with its bail-locking devices; and to that end the invention consists in the novel construction and combination of the rear clip-nut and bail to be locked thereon, as hereinafter described, and set forth in the claims.

In the accompanying drawings, Figure 1 is a side view of a thill-coupling embodying my improvements. Fig. 2 is a rear view of the same. Fig. 3 is a side view of a portion of a thill-coupling, illustrating a modification of my invention. Fig. 4 is a detail plan view of the rear clip-nut. Fig. 5 is a detail view of the bail, and Fig. 6 illustrates a plan view of a modification of the clip-nut.

Referring to the drawings, A denotes the front axle of the vehicle, and A' the bed-piece, clamped thereon by means of the clip B, clip-bar C, and nuts $a$ $a'$ in the usual and well-known manner. On said clip are formed the usual shackle-ears $b$ $b$, between which is inserted the shackle-eye $c$, formed on the thill-iron $d$ and connected to said ears by means of the coupling pin or bolt $e$, passing through said ears and intervening eye. The pin is formed with an arm $f$, extending laterally from one end thereof and terminating with a bar $g$, which is parallel with the coupling-pin.

$h$ represents an antirattler-jaw, which is pressed firmly onto the back of the shackle-eye $c$ and maintains the same in constant contact with the coupling-pin $e$.

$i$ represents the spring by means of which the antirattler-jaw $h$ receives the aforesaid pressure. Said spring extends downward from the jaw $h$ and thence rearward under the axle and has connected to its rear end a lever $b'$, which is fulcrumed on a bail $c'$, suspended from the rear clip-nut $a'$, which latter is provided with my improved bail-locking devices, consisting of the locking-shoulders $d'$ $d'$, which project laterally from opposite sides of the nut and form a duplex lock to more positively prevent the bail $c'$ from accidentally slipping off from the nut $a'$, even in case one of said shoulders should be accidentally broken off, said shoulders being formed by notches cut in the sides of the nut between the shoulders simultaneously with the punching of the bolt-hole in said nut, and thus expediting and cheapening the manufacture and also retaining the entire depth of the nut across the bail-locking devices, and consequently imparting maximum strength to said devices. By providing both the front and rear ends of the nut with said duplex locking-shoulders, as shown in the annexed drawings, the bail-locking devices can be renewed when required by turning the nut end for end without necessitating the removal of the nut from the clip.

In some cases I prefer to employ a separate plate $f'$, provided with said locking-shoulders, which plate is clamped between the nut $a'$ and clip-bar C, as shown in Fig. 3 of the drawings, and the shoulders may be formed either as shown in Fig. 4 or Fig. 6.

To allow the bail $c'$ to be placed upon the nut $a'$ and to be securely locked thereon, I construct said bail of the form illustrated in Figs. 2 and 5 of the drawings—i. e., the lower end portions of the vertical arms of the bail are disposed a sufficient distance apart to receive between them the shoulders $d'$ $d'$, and the upper end portions of said arms are disposed parallel and nearer to each other to closely embrace the sides of the nut adjacent to the shoulders $d'$ $d'$ and united by a horizontal bar to ride thereby upon the top of the nut, as shown in Fig. 1 of the drawings. The bail $c'$ is placed in its locked position on the nut $a'$ by lifting the bail sufficiently to carry the contracted upper end portion thereof above the shoulders $d'$ $d'$ and then pushing said portion of the bail forward until said shoulders have passed through the wider portion of the bail and then allowing the bail to drop, with its upper cross-bar, onto the top of the nut, and when thus placed the upper end portions of the arms of the bail become engaged with the fronts of the two shoulders $d'$ $d'$ on opposite sides of the nut, and thus the bail is securely locked in its position on the nut.

The antirattler-jaw $h$ is formed with a sleeve $g'$, which extends across the jaw and embraces the parallel bar $g$, and is thus pivoted directly to said bar.

The spring $i$ is fastened to the jaw $h$ by means of a shoe $h'$, formed on the jaw and receiving the spring through it.

The shoe $h'$ is formed on the back of the antirattler-jaw by a plate $i'$, which bears on the clip-bar C and serves as a wear-plate, a detailed description of said parts being unnecessary, as they do not pertain to the present invention and are fully shown and described in the United States Letters Patent hereinbefore referred to.

The lever $b'$ is formed so as to lie with its central or main portion directly in contact with the under side of the spring $i$ when the parts are in coupled position. Said contact of the lever guards against the breakage of the lever by concussion incident to the spring action imparted to it in throwing it forward into the aforesaid position.

To simplify the construction of the spring $i$ and relieve it as much as possible from torsional strain at the bend thereof required to extend it rearward from its connection with the antirattler-jaw, as aforesaid, I form said spring with a single curve $a^2$, which extends directly rearward from the vertical portion of the spring. The upper end of the spring is extended and bears on the back of the jaw $h$, as shown in Fig. 1.

What I claim is—

1. In a thill-coupling of the within-described class, the clip-nut formed with duplex locking-shoulders projecting laterally from the sides thereof, and the locking-bail having the lower end portions of its arms disposed apart to receive between them the aforesaid shoulders, and the upper end portions of said arms disposed parallel and nearer to each other to closely embrace the sides of the nut and united by a horizontal bar to ride upon the top of said nut, all constructed and combined to operate substantially as set forth and shown.

2. In a thill-coupling, the combination with the coupling-pin, a spring connected at its front end to said coupling-pin, and a lever connected to the opposite end of said spring, of a lock-plate secured to the axle and adapted to be reversed end for end and provided with two pairs of shoulders on its side edges and disposed at the rear and front respectively, and a bail connected at one end to said lever and formed at its opposite end so as to pass over the lock-plate and terminated with a laterally-contracted neck to engage the rear pair of shoulders on said lock-plate substantially as described.

BURTON G. FOSTER. [L. S.]

Witnesses:
H. B. SMITH,
WM. HAWLEY.